(12) United States Patent
Phillips

(10) Patent No.: US 7,971,415 B2
(45) Date of Patent: Jul. 5, 2011

(54) GRASS MOWING MACHINE HAVING ADJUSTABLE WIDTH TOOLBAR FOR MOUNTING CUTTING UNITS

(75) Inventor: David Lawrence Phillips, Willow Springs, NC (US)

(73) Assignee: Deere & Company, Moline, IL (US)

( * ) Notice: Subject to any disclaimer, the term of this patent is extended or adjusted under 35 U.S.C. 154(b) by 232 days.

(21) Appl. No.: 12/128,256

(22) Filed: May 28, 2008

(65) Prior Publication Data
US 2009/0293439 A1    Dec. 3, 2009

(51) Int. Cl.
*A01D 75/30* (2006.01)
(52) U.S. Cl. ...................................... 56/7; 56/6
(58) Field of Classification Search ............... 56/6, 7, 56/13.5–13.8, 15.5, 14.7, 14.9, 156, 208, 56/228, 249, 294, DIG. 9, DIG. 10
See application file for complete search history.

(56) References Cited

U.S. PATENT DOCUMENTS

| | | | |
|---|---|---|---|
| 3,608,284 A * | 9/1971 | Erdman | 56/6 |
| 3,757,500 A * | 9/1973 | Averitt | 56/6 |
| 3,832,834 A * | 9/1974 | Kovacs | 56/6 |
| 4,123,082 A * | 10/1978 | Conner | 280/467 |
| 4,467,872 A | 8/1984 | Hodapp | |
| 4,677,787 A | 7/1987 | Said | |
| 4,744,580 A * | 5/1988 | Ryan | 56/6 |
| 4,815,259 A * | 3/1989 | Scott | 56/6 |
| 5,042,236 A * | 8/1991 | Lamusga et al. | 56/7 |
| 5,297,378 A * | 3/1994 | Smith | 56/7 |
| 5,343,680 A * | 9/1994 | Reichen et al. | 56/249 |
| RE34,921 E * | 5/1995 | Lamusga et al. | 56/7 |
| 5,423,565 A * | 6/1995 | Smith | 280/411.1 |
| 5,459,984 A * | 10/1995 | Reichen et al. | 56/7 |
| 6,293,352 B1 | 9/2001 | Hundeby et al. | |
| 6,408,950 B1 | 6/2002 | Shoup | |
| 2005/0229567 A1* | 10/2005 | Phillips | 56/7 |
| 2006/0174599 A1* | 8/2006 | Hironimus | 56/6 |
| 2007/0137159 A1* | 6/2007 | Reichen et al. | 56/7 |
| 2008/0127619 A1* | 6/2008 | Link | 56/6 |
| 2008/0196380 A1* | 8/2008 | Link et al. | 56/320.1 |

* cited by examiner

*Primary Examiner* — Thomas B Will
*Assistant Examiner* — Joan D Misa

(57) ABSTRACT

A grass mowing machine has a frame with an adjustable width toolbar including a center section and left and right outer sections telescoping into the center section. A pair of cutting units are mounted to lift arms pivotably connected to outboard ends of the outer sections of the adjustable width toolbar. A hydraulic lift cylinder is mounted between an inboard end of each lift arm and the adjustable width toolbar at a selected mounting point in the center section. The mounting point of the center section is aligned with a mounting point in one of the outer sections to provide a specified toolbar width suitable for the cutting units.

10 Claims, 5 Drawing Sheets

GRASS MOWING MACHINE HAVING ADJUSTABLE WIDTH TOOLBAR FOR MOUNTING CUTTING UNITS

FIELD OF THE INVENTION

This invention relates generally to grass mowing machines, and particularly to mowers used to cut grass on golf courses and other areas where a high quality cut is desired. More specifically, the invention relates to grass mowing machines with multiple cutting units mounted thereto.

BACKGROUND OF THE INVENTION

Grass mowing machines used for golf courses and other areas where a high quality cut is desired include fairway mowers, trim mowers and greens mowers, all of which typically have three or more cutting units mounted to a traction frame. Each cutting unit may be pivotably mounted to a lift arm extending from the frame of the traction vehicle. Each reel cutting unit typically has a width of 18 inches up to 36 inches. Wider cutting units help increase mowing productivity for large wide open areas such as golf course fairways, and narrower cutting units are more useful for mowing where space is limited or restricted, or where terrain is uneven.

Although there exist a wide range of mowing applications, including a variety of different golf course environments, grass mowing machine frames are designed to carry cutting units of a specific width. Wider or narrower cutting units cannot be substituted on the same machine, even if lift arms with suitable lengths are provided. The frame of a grass mowing machine does not provide sufficient gaps between wider cutting units, or provides excessive gaps between narrower cutting units.

As a result, manufacturers, dealers and operators cannot freely substitute different size cutting units on the same grass mowing machine. A grass mowing machine is needed that can carry different width cutting units, and still provide appropriate gaps between the cutting units. It also is desirable to reduce the number of different mowing machine sizes and models that are manufactured, sold and used.

SUMMARY OF THE INVENTION

The invention relates to a grass mowing machine with an adjustable width toolbar for mounting cutting units. The adjustable width toolbar has a center section and a pair of outer sections removably mounted to the opposing ends of the center section. Each outer section may be secured to the center section at a first mounting point, a second mounting point, or a third mounting point. Each mounting point defines a different toolbar width suitable for cutting units having a specified width. The cutting unit on each lift arm at the end of each outer section may be raised and lowered by a hydraulic lift cylinder connected to one of the first, second and third mounting points. As a result, a grass mowing machine can carry different width cutting units, and still provide the necessary gaps between the cutting units.

DESCRIPTION OF THE PREFERRED EMBODIMENT

Figure 1:
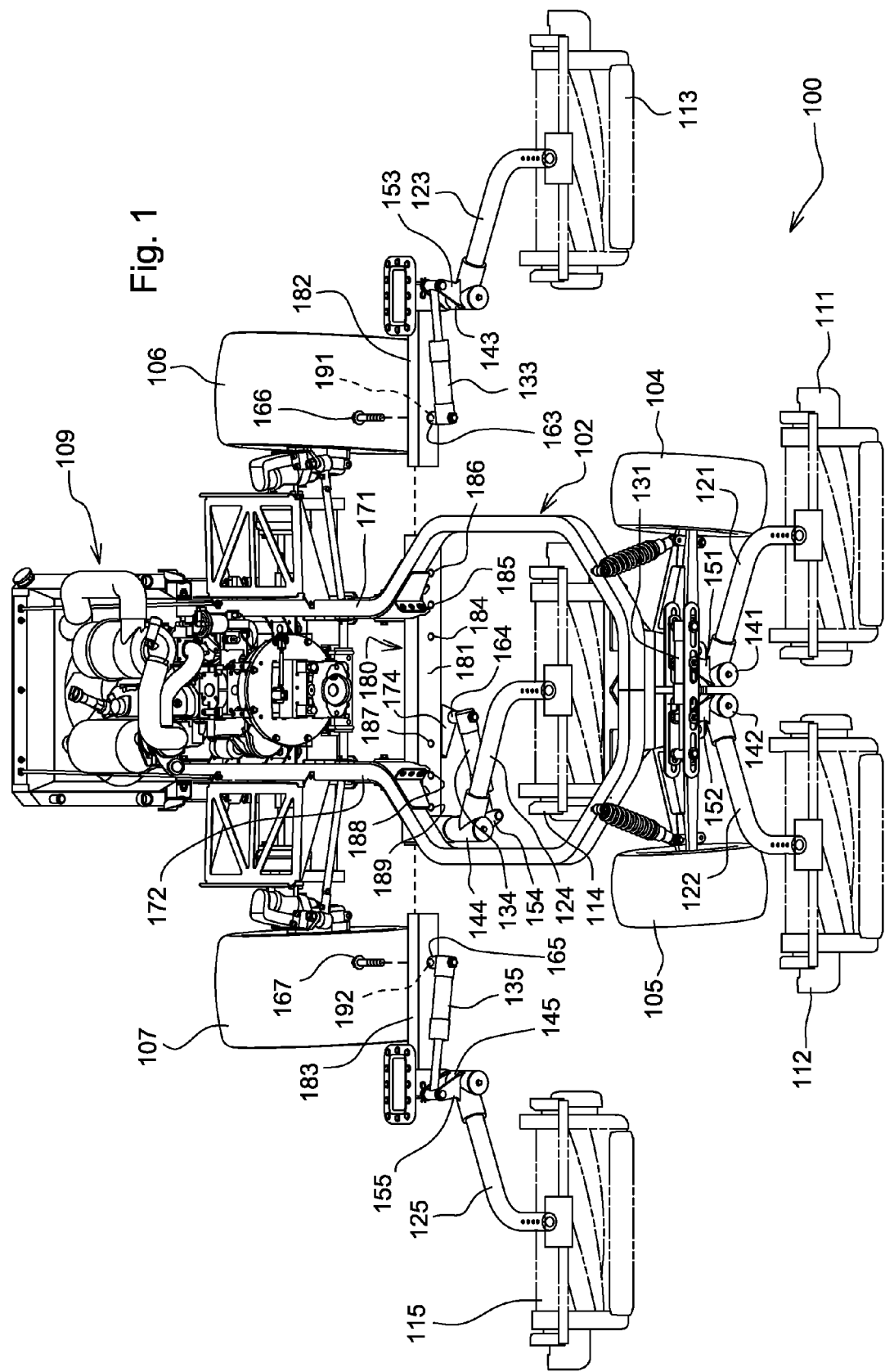
FIG. 1 is an exploded perspective view of a frame of a grass mowing machine with reel cutting units mounted to an adjustable width toolbar according to a first embodiment of the invention.

In one embodiment of the present invention, grass mowing machine 100 includes tubular steel frame 102 which may be supported on front wheels 104-05 and rear wheels 106-07. The frame may support an internal combustion engine 109 or other power source mounted thereon, and an operator station or platform where an operator may ride and control the machine. The frame may include left and right longitudinal members 171-72.

In the embodiment shown, the grass mowing machine may be a fairway mower that carries five reel cutting units, including a front pair of cutting units and three rear or back row cutting units. Alternatively, instead of reel cutting units, rotary cutting units with mower decks may be used. The front pair of cutting units are towed or otherwise propelled, while mowing, forwardly of the frame. The three rear or back row cutting units include a pair of cutting units that are outboard of the frame, to the left and right of the longitudinal frame members, and a third cutting unit between the pair that is inboard of the frame. The lift arms for each of the cutting units may be pivotably mounted to the frame.

In one embodiment, the rear cutting units are mounted to an adjustable width toolbar 180 which extends transversely to the longitudinal frame members and the direction of travel of the machine. The adjustable width toolbar includes center section 181 welded or otherwise secured to the longitudinal members 171-72 of the frame, and left and right outer sections 182-83 that telescope into the center portion.

Figure 2:
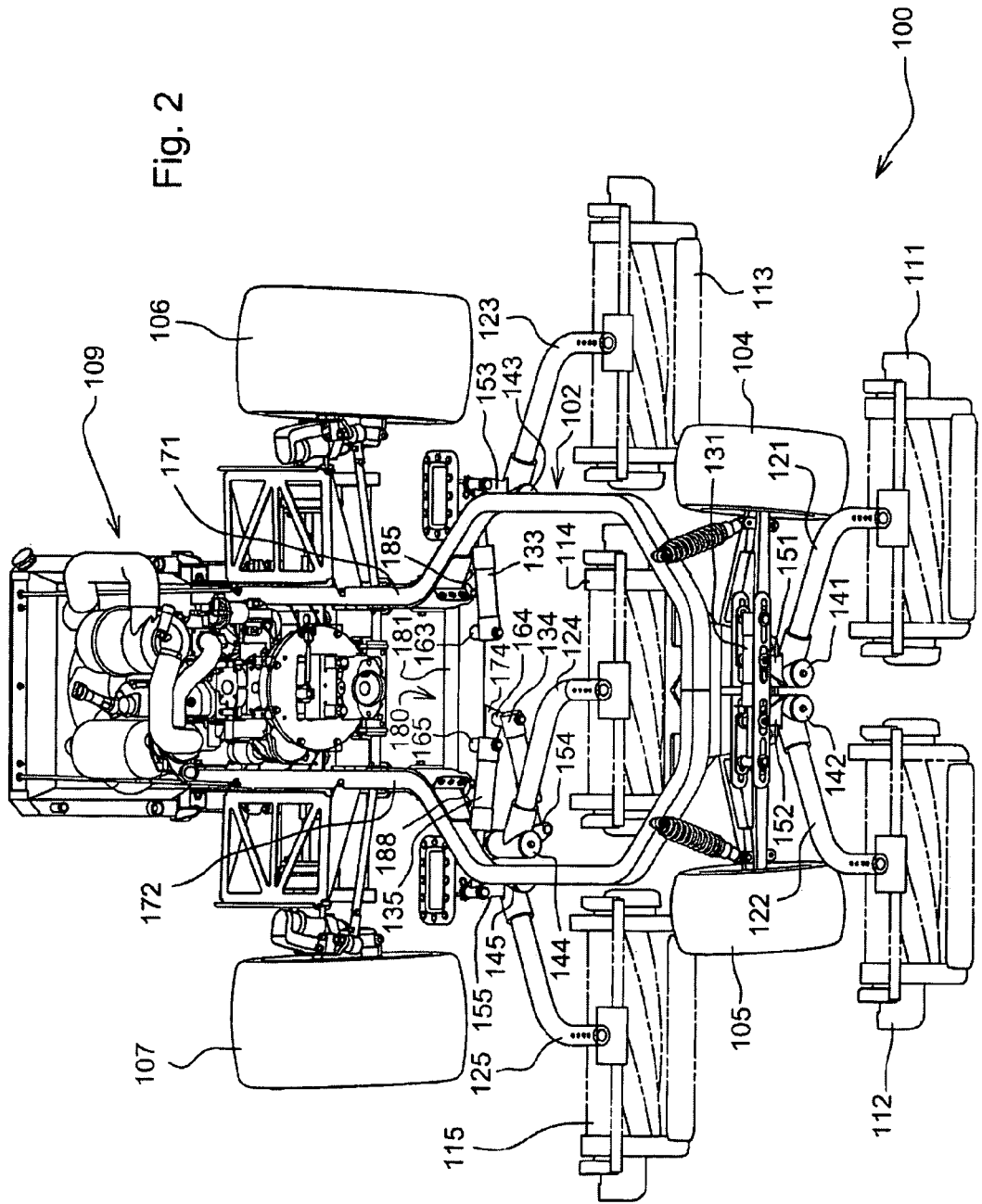
FIG. 2 is a top perspective view of a the frame of a grass mowing machine with reel cutting units mounted to an adjustable width toolbar according to a first embodiment of the invention, with the toolbar in a first or minimum width position.

In FIGS. 1 and 2, cutting units 111-15 have a width of 22 inches each and are mounted to lift arms 121-25. Lift arms 123 and 125 may be pivotably mounted at or near the outboard ends of the left and right outer sections 182-83 of the adjustable width toolbar, while lift arm 124 may be pivotably mounted to the center section 181 of the adjustable width toolbar.

In one embodiment, lift arms 121-25 and their associated cutting units may be raised and lowered by use of hydraulic lift cylinders. The front pair of cutting units 111-12 may be raised and lowered using hydraulic lift cylinder 131, which may be operably connected to crank arms 151-52 to pivot the front pair of cutting units on pivot axes 141-42. The rear three cutting units 113-15 may be raised and lowered using hydraulic lift cylinders 133-35, which may be operably connected to crank arms 153-55 to pivot the rear cutting units on pivot axes 143-45.

In one embodiment, hydraulic lift cylinder 133 extends between crank arm 153 at the inboard, pivoting end of lift arm 123 and a mounting point on the adjustable width toolbar, so that cutting unit 113 may pivot on axis 143. Additionally, hydraulic lift cylinder 135 extends between crank arm 155 at the inboard, pivoting end of lift arm 125 and another mounting point on the adjustable width toolbar.

In one embodiment, center section 181 of the adjustable width toolbar has a plurality of left mounting points 184-86, each of which may be aligned with mounting point 191 on the left outer section 182 of the adjustable width toolbar. The center section also may have a plurality of right mounting points 187-89, each of which may be aligned with mounting point 192 on the right outer section 183 of the adjustable width toolbar. The mounting points may be holes through the outer sections that may be aligned with holes through the center section so that the toolbar width is suitable for a selected width cutting unit.

Figure 5:
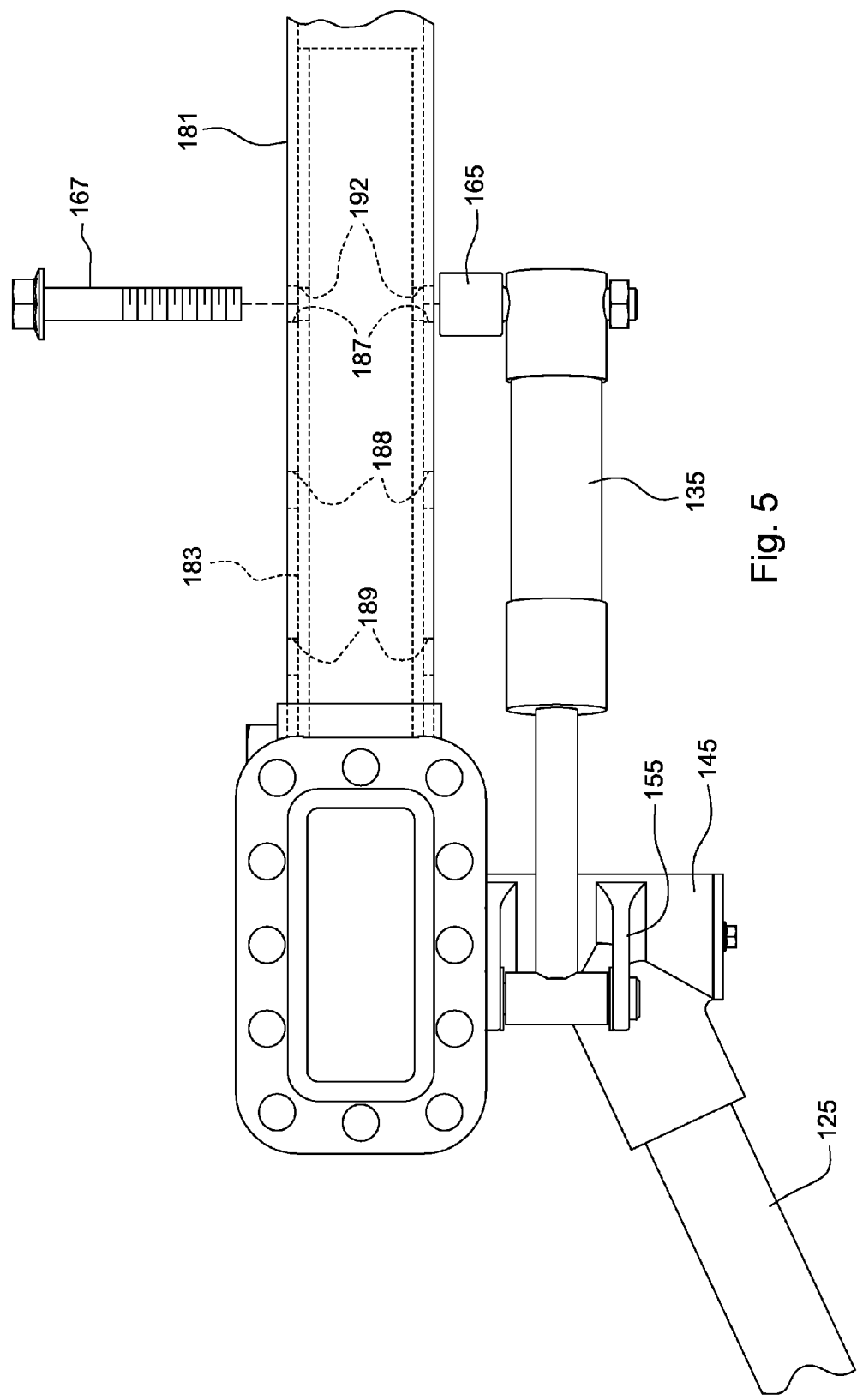
FIG. 5 is a top view of an outer section of a variable width toolbar in a first embodiment of the invention.

Now referring to FIG. 5, the right outer section 183 of the adjustable width toolbar is shown fastened to center section 181 at a minimum width position for 22 inch width cutting units. The right outer section is fastened to the center section by aligning hole 192 in the right outer section with hole 187 in the center section, and inserting threaded fastener 167 or pin through the corresponding holes. The threaded fastener or pin then engages spacer 165 pivotably mounted to hydraulic lift cylinder 135.

Similarly, the left outer section 182 of the adjustable width toolbar may be fastened to the center section at a minimum width position for 22 inch width cutting units by aligning hole 191 in the left outer section with hole 184 in the center section, and inserting threaded fastener 166 or pin through the corresponding holes. The threaded fastener or pin then engages spacer 163 pivotably mounted to lift cylinder 133.

In one embodiment, bracket 174 may be welded to the center section of the adjustable width toolbar where spacer 164 may be mounted for the center back row cutting unit 114.

Figure 3:
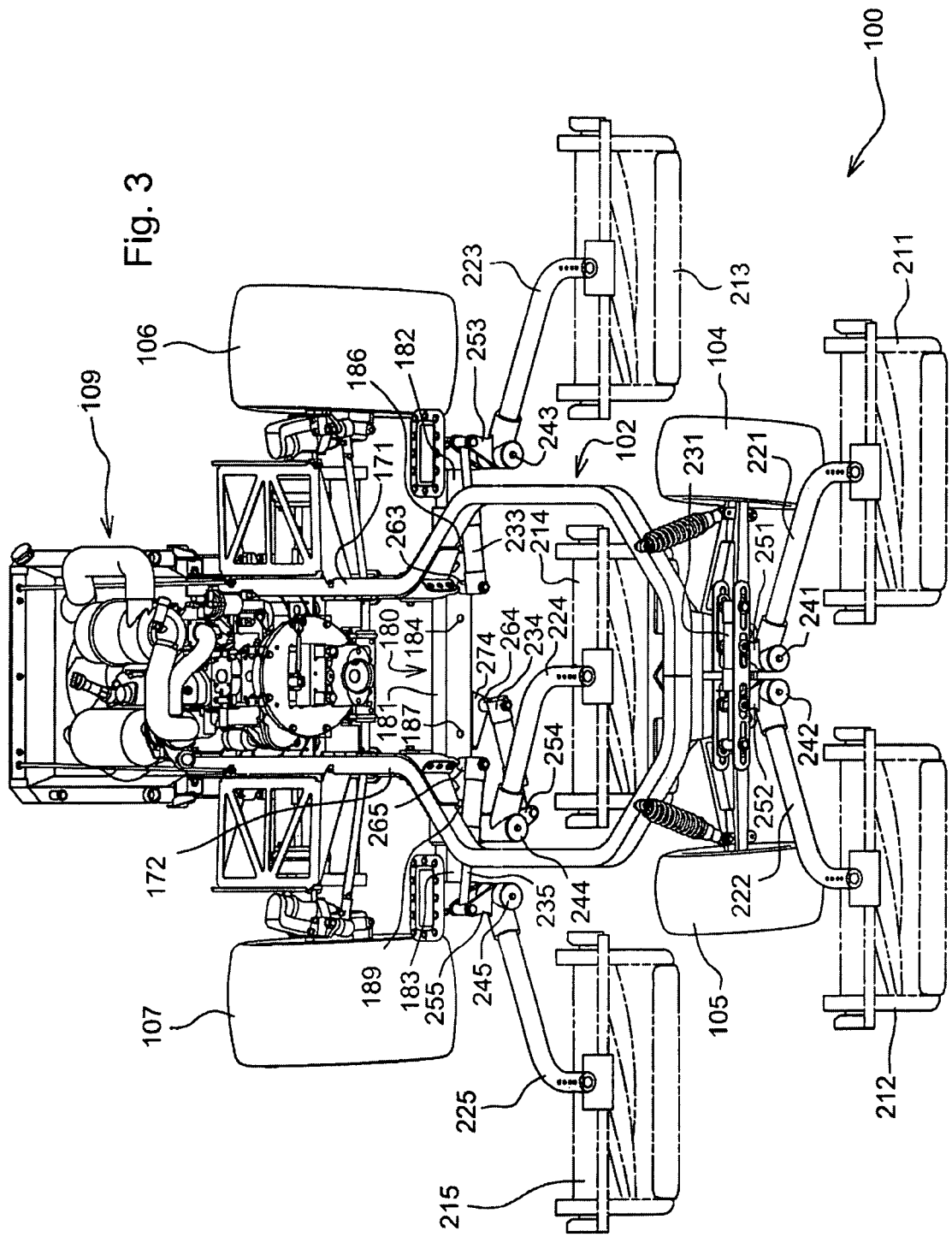
FIG. 3 is a top perspective view of a frame of a grass mowing machine with reel cutting units mounted to an adjustable width toolbar according to a first embodiment of the invention, with the toolbar in a second or medium width position.

In FIG. 3, cutting units 211-15 have a width of 26 inches each and are mounted to lift arms 221-25. The lift arms for 26 inch cutting units may be longer than those for narrower 22 inch width cutting units. Lift arms 223 and 225 are pivotably mounted at or near the outboard ends of the left and right outer sections 182-83 of the adjustable width toolbar, while lift arm 224 is pivotably mounted to the center section 181 of the adjustable width toolbar.

In the embodiment of FIG. 3, the front pair of cutting units 211-12 may be raised and lowered using hydraulic lift cylinder 231, which may be operably connected to crank arms 251-52 to pivot the front pair of cutting units on pivot axes 241-42. The rear three cutting units 213-15 may be raised and lowered using hydraulic lift cylinders 233-35, which may be operably connected to crank arms 253-55 to pivot the rear cutting units on pivot axes 243-45.

In one embodiment, hydraulic lift cylinder 233 extends between crank arm 253 at the inboard, pivoting end of lift arm 223 and a mounting point on the adjustable width toolbar, so that cutting unit 213 may pivot on axis 243. Additionally, hydraulic lift cylinder 235 extends between crank arm 255 at the inboard, pivoting end of lift arm 225 and another mounting point on the adjustable width toolbar.

In FIG. 3, the right outer section 183 of the adjustable width toolbar is fastened to center section 181 at a medium width position for 26 inch width cutting units. The right outer section is fastened to the center section by aligning hole 192 in the right outer section with hole 188 in the center section, and inserting a threaded fastener through the corresponding holes to engage spacer 265 pivotably mounted to hydraulic lift cylinder 235.

Similarly, the left outer section 182 of the adjustable width toolbar may be fastened to the center section at a medium width position for 26 inch width cutting units by aligning hole 191 in the left outer section with hole 185 in the center section, and inserting a threaded fastener or pin through the corresponding holes so that it engages spacer 263 pivotably mounted to lift cylinder 233.

In the medium width embodiment of FIG. 3, bracket 274 is welded to the center section of the adjustable width toolbar, where spacer 264 may be mounted for the center back row cutting unit 214.

Figure 4:
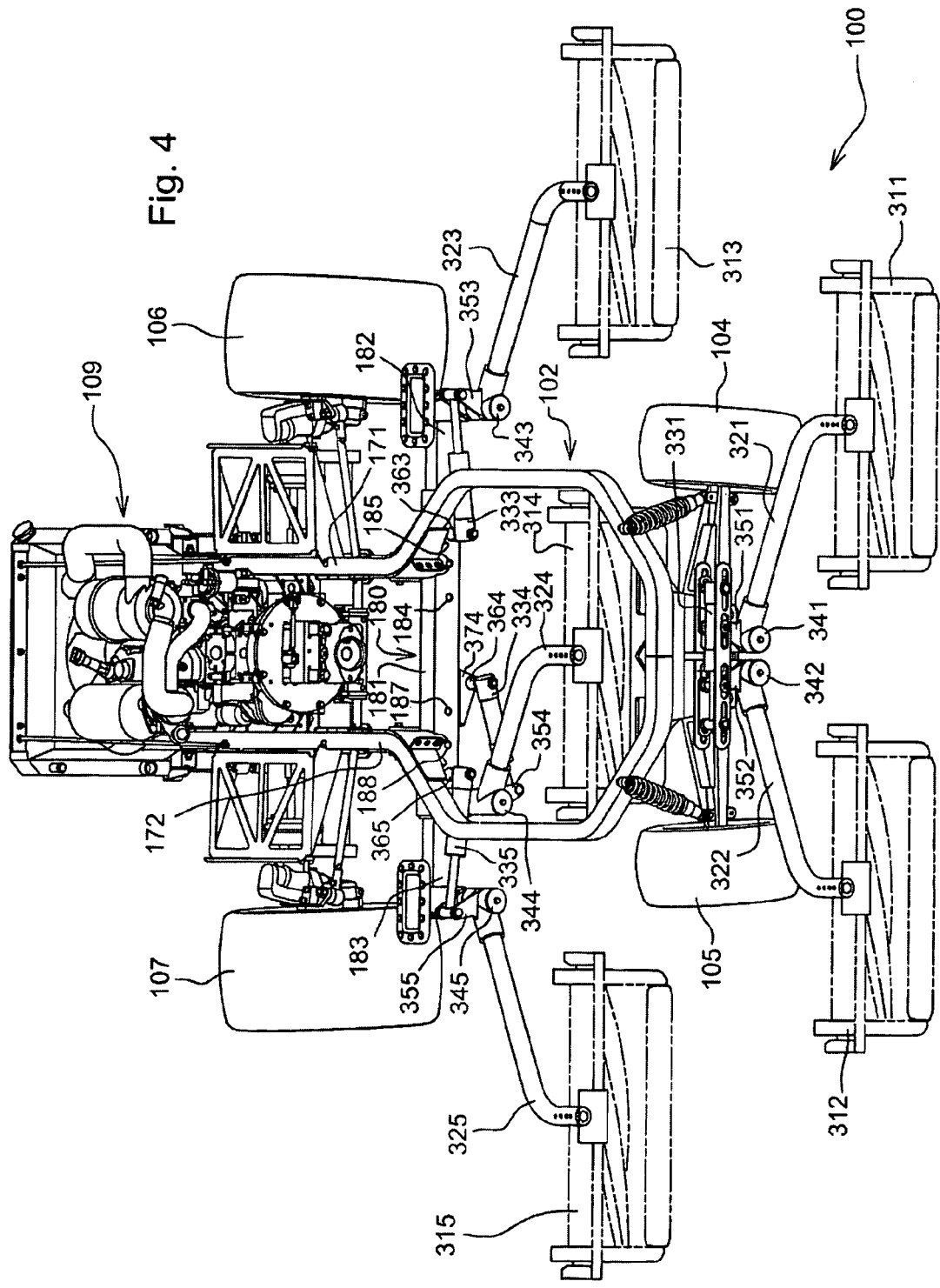
FIG. 4 is a top perspective view of a frame or a grass mowing machine with reel cutting units mounted to an adjustable width toolbar according to a first embodiment of the invention, with the toolbar in a third or maximum width position.

In FIG. 4, cutting units 311-15 have a width of 30 inches each and are mounted to lift arms 321-25. The lift arms for 30 inch cutting units may be longer than those for the narrower 26 inch width cutting units. Lift arms 323 and 325 are pivotably mounted at or near the outboard ends of the left and right outer sections 182-83 of the adjustable width toolbar, while lift arm 324 is pivotably mounted to the center section 181 of the adjustable width toolbar.

In the embodiment of FIG. 4, the front pair of cutting units 311-12 may be raised and lowered using hydraulic lift cylinder 331, which may be operably connected to crank arms 351-52 to pivot the front pair of cutting units on pivot axes 341-42. The rear three cutting units 313-15 may be raised and lowered using hydraulic lift cylinders 333-35, which may be operably connected to crank arms 353-55 to pivot the rear cutting units on pivot axes 343-45.

In one embodiment, hydraulic lift cylinder 333 extends between crank arm 353 at the inboard, pivoting end of lift arm 323 and a mounting point on the adjustable width toolbar, so that cutting unit 313 may pivot on axis 343. Additionally, hydraulic lift cylinder 335 extends between crank arm 355 at the inboard, pivoting end of lift arm 325 and another mounting point on the adjustable width toolbar.

In FIG. 3, the right outer section 183 of the adjustable width toolbar is fastened to center section 181 at a maximum width position for 30 inch width cutting units. The right outer section is fastened to the center section by aligning hole 192 in the right outer section with hole 189 in the center section, and inserting a threaded fastener or pin through the corresponding holes to engage spacer 365 pivotably mounted to hydraulic lift cylinder 335.

Similarly, the left outer section 182 of the adjustable width toolbar may be fastened to the center section at a medium width position for 30 inch width cutting units by aligning hole 191 in the left outer section with hole 186 in the center section, and inserting a threaded fastener through the corresponding holes so that it engages spacer 363 pivotably mounted to lift cylinder 333.

In the maximum width embodiment of FIG. 3, bracket 374 is welded to the center section of the adjustable width toolbar, where spacer 364 may be mounted for the center back row cutting unit 314.

In one embodiment, each outer section of the adjustable width toolbar telescopes into the center section, and an assembler or operator can line up the mounting points in the outer sections with selected mounting points in the center section to provide a toolbar width that is acceptable and suitable for the cutting units being mounted thereto. The mounting points are located so that the rear cutting units have acceptable overlap with the front cutting units, to maximize productivity and prevent any unacceptable contact between adjacent cutting units when mowing.

Additionally, the mounting holes provide attachment points for the inboard ends of hydraulic lift cylinders. Additionally, the threaded fastener or pin may be easily removed so that the toolbar width can be changed, and so that each lift arm can be replaced with a longer lift arm to accommodate a wider cutting unit, or a shorter lift arm for a narrower cutting unit.

Having described the preferred embodiment, it will become apparent that various modifications can be made without departing from the scope of the invention as defined in the accompanying claims.

The invention claimed is:

1. A grass mowing machine, comprising:
    a frame having an adjustable width toolbar including a center section and left and right outer sections telescoping into the center section;
    the adjustable width toolbar being adjustable between at least a first width and a second width;
    the first width accommodating a first pair of cutting units supported by a first pair of lift arms, each lift arm of the first pair of lift arms pivotably connected to an outboard end of one of the outer sections of the adjustable width toolbar; and
    a first hydraulic lift cylinder mounted between an inboard end of each first lift arm and the adjustable width toolbar at a first selected mounting point in the center section that is aligned with a mounting point in one of the outer sections to provide a specified toolbar width for the first pair of cutting units;
    the second width accommodating a second pair of cutting units wider than the first pair of cutting units supported by a second pair of lift arms, each lift arm of the second pair of lift arms being longer than the first pair of lift arms and pivotably connected to an outboard end of one of the outer sections of the adjustable width toolbar; and
    a second hydraulic lift cylinder mounted between an inboard end of each second lift arm and the adjustable width toolbar at a second selected mounting point in the center section that is aligned with a mounting point in one of the outer sections to provide a specified toolbar width for the second pair of cutting units.

2. The grass mowing machine of claim 1 wherein the mounting points are holes extending through the center section and the outer sections of the adjustable width toolbar.

3. The grass mowing machine of claim 2 further comprising a pin inserted through the holes in the center section and one of the outer sections that connects the hydraulic lift cylinder to the adjustable width toolbar and secures the outer section to the center section and the specified toolbar width.

4. The grass mowing machine of claim 1 further comprising a third cutting unit mounted to a lift arm pivotably connected to the toolbar between the first pair of cutting units.

5. The grass mowing machine of claim 1 wherein the first pair of cutting units are located outboard of the frame.

6. The grass mowing machine of claim 1 wherein each hydraulic lift cylinder is connected to a crank at an inboard end of one of the lift arms.

7. The grass mowing machine of claim 1 wherein
    the adjustable width toolbar being adjustable to a third width to accommodate a third pair of cutting units wider than the second pair of cutting units supported by a third pair of lift arms longer than the second pair of lift arms and pivotably connected to an outboard end of one of the outer sections of the adjustable width toolbar; and
    a third hydraulic life cylinder mounted between an inboard end of each third lift arm and the adjustable width toolbar at a third selected mounting point in the center section that is aligned with a mounting point in one of the outer sections to provide a specified toolbar width for the third pair of cutting units.

8. The grass mowing machine of claim 7 wherein the first, second and third mounting points are holes in the center section of the toolbar.

9. The grass mowing machine of claim 8 further comprising a pin inserted through the holes in the center section of the toolbar where the hydraulic lift cylinder is connected.

10. The grass mowing machine of claim 7 wherein the outer sections telescope into the center section.

* * * * *